UNITED STATES PATENT OFFICE.

BRUNO BEIER, OF BOONTON, NEW JERSEY.

FLYING-MACHINE.

1,172,338.      Specification of Letters Patent.      Patented Feb. 22, 1916.

Application filed September 12, 1914. Serial No. 861,375.

*To all whom it may concern:*

Be it known that I, BRUNO BEIER, a subject of the German Emperor, residing at Boonton, in the county of Morris and State of New Jersey, have invented certain new and useful Improvements in Flying-Machines, of which the following is a specification.

The present invention relates to flying machines and has for its object to provide a flying machine heavier than air which will be of simple, durable and efficient construction.

Figure 1:
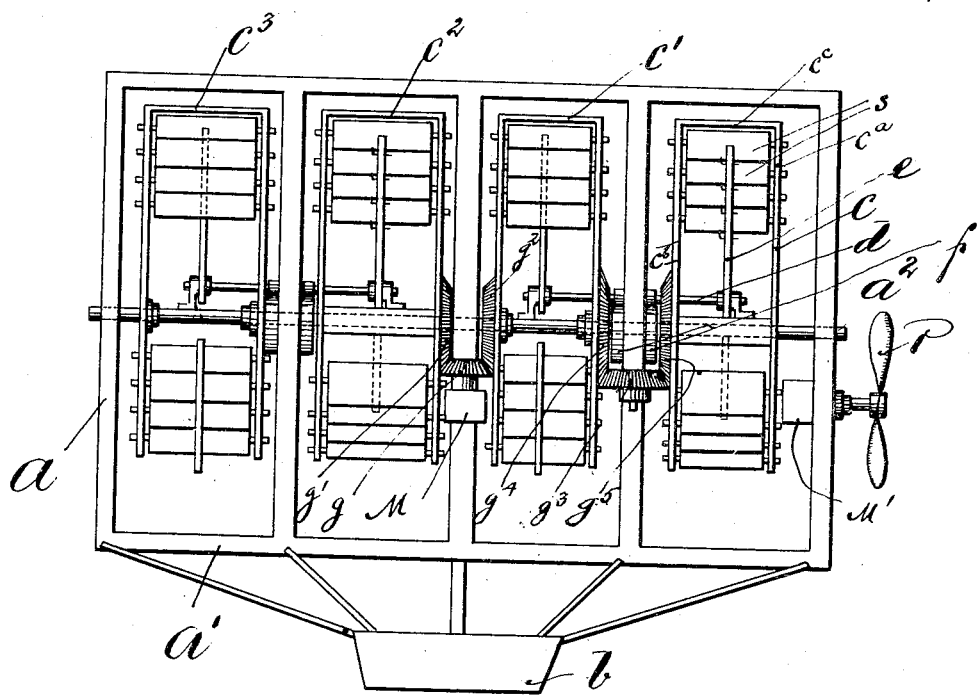
Figures 2, 3:
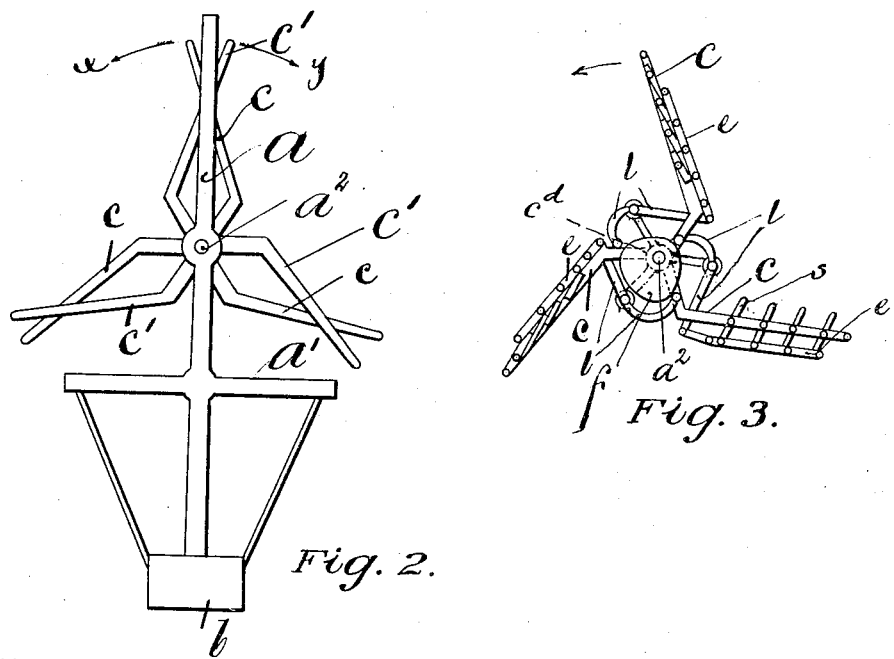

My invention is illustrated in the accompanying drawing which forms part of this specification and in which similar reference characters denote corresponding parts, Figure 1 being a side elevation; Fig. 2 an end elevation of the machine and Fig. 3 a detail thereof.

The machine comprises a skeleton frame $a$, $a'$ of any suitable material from which a gondola $b$ is suitably suspended. Extending longitudinally and centrally through the frame $a$ is a spindle $a^2$ adapted to carry an even number of wings $c$, $c'$, $c^2$, $c^3$. Each wing comprises skeleton frames composed of side bars $c^a$, $c^b$ united at their outer ends by a cross bar $c^c$. There are two series of wings, one series as $c$, $c^2$ having their frames fixed to sleeves $c^d$ or the like loosely mounted on the spindle $a^2$, and the other series as $c'$, $c^3$ having their frames fixed directly to the said spindle. The several members of each wing are arranged equidistantly from or at equal angles to one another. In the example shown four wings are employed. Relative to one another the wings are so arranged that they extend and are adapted to turn alternately in different directions. Thus from Fig. 2 the two adjoining wings $c$, $c'$ are shown with their members extending in opposite directions and the arrows $x$, $y$ indicate the directions of rotation thereof. Motion to these wings may be transmitted from a suitable motor M through the medium of a gear $g$ which meshes with gears $g'$, $g^2$ of which $g'$ is fixed to the wing $c^2$ and $g^2$ to the wing $c'$. Through gears $g^3$, $g^4$ and $g^5$ motion is transmitted to the wing $c$ and through the spindle $a^2$ to the wing $c^3$. In the present example it is assumed that two of the wings as $c'$, $c^3$ are fixed to the spindle and two as $c^2$ and $c$ are loose on the spindle $a^2$. Of course any other arrangement may be provided to transmit alternate rotary movements to the wings.

Fixed to the frame $a$ and mounted on the spindle adjacent to each wing is a cam $f$ which in any convenient manner, as for instance by a lever $l$, operates a shutter mechanism $s$ provided for each member of each wing. The shutter mechanism comprises a number of plates or blades pivotally mounted in the side bars $c^a$, $c^b$ of each member of a wing and connected to an arm $e$ which is connected to the lever operated from the cam $f$. As seen from Fig. 3 all three shutter mechanisms of one wing are operated from one cam and the cam is so shaped that the different shutters will alternately open and close. The different plates or blades of a shutter will be closed on one another when the respective member carrying it will swing downwardly and will constitute a plane acting on the air below to lift the machine just like in an ordinary aeroplane. When the same member swings upwardly, however, the blades will open and permit the passage of air.

In Fig. 3 one of the wings is shown in detail, illustrating the operation of the shutter mechanisms of its three members. The forward propulsion may be effected by a propeller P of any suitable construction and which may be driven from a motor M'.

What I claim is:

In a flying machine, a skeleton frame, a spindle extending longitudinally of and rotatively borne in said frame, a number of wings on said spindle divided into two series revolving in opposite directions, transmission means for operating said wings, shutter mechanisms for said wings, each shutter mechanism consisting of a number of swinging blades, cams on said frame and means operated from said cams and serving to impart motion to said shutter mechanism so as to close during the downward movement of said wings and to form aeroplanes and to open during the upward movement of said wings.

In testimony whereof I affix my signature in presence of two witnesses.

BRUNO BEIER.

Witnesses:
    E. D. JUNIOR,
    D. KLEIN.